(12) United States Patent
Matsusue et al.

(10) Patent No.: US 10,647,212 B2
(45) Date of Patent: May 12, 2020

(54) OUTPUT PREDICTION DEVICE FOR FUEL CELL, OUTPUT PREDICTION METHOD FOR FUEL CELL AND FUEL CELL SYSTEM

(71) Applicant: TOYOTA JIDOSHA KABUSHIKI KAISHA, Toyota-shi, Aichi-ken (JP)

(72) Inventors: Masaaki Matsusue, Mishima (JP); Yasushi Araki, Gotenba (JP); Masayuki Ito, Shizuoka-ken (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 185 days.

(21) Appl. No.: 15/861,356

(22) Filed: Jan. 3, 2018

(65) Prior Publication Data

US 2018/0215283 A1 Aug. 2, 2018

(30) Foreign Application Priority Data

Jan. 27, 2017 (JP) ................................. 2017-013506

(51) Int. Cl.
*B60L 1/02* (2006.01)
*B60L 11/18* (2006.01)
*H01M 8/04298* (2016.01)
*H01M 8/04537* (2016.01)
*H01M 16/00* (2006.01)
(Continued)

(52) U.S. Cl.
CPC .............. *B60L 11/1887* (2013.01); *B60L 1/02* (2013.01); *B60L 58/12* (2019.02); *B60L 58/40* (2019.02);
(Continued)

(58) Field of Classification Search
CPC ................................................... B60L 11/1887
See application file for complete search history.

(56) References Cited

U.S. PATENT DOCUMENTS 9,587,954 B2 * 3/2017 Gusikhin ........... G01C 21/3469
2002/0069000 A1 6/2002 Nakao
(Continued)

FOREIGN PATENT DOCUMENTS

JP 2002171603 A 6/2002
JP 2003189414 A 7/2003
(Continued)

OTHER PUBLICATIONS

U.S. Appl. No. 15/714,461, filed Sep. 25, 2017.

*Primary Examiner* — Alex C Dunn
(74) *Attorney, Agent, or Firm* — Hunton Andrews Kurth LLP

(57) ABSTRACT

An output prediction device for a fuel cell includes: a first acquisition circuitry configured to acquire a first required output of the fuel cell, the first required output being calculated based on a predicted vehicle speed or a predicted acceleration of a vehicle on a scheduled traveling route for the vehicle, the vehicle traveling by using the fuel cell as a dynamic power source; a second acquisition circuitry configured to acquire a second required output of the fuel cell, the second required output being required by an air-conditioning device of the vehicle; and a calculation circuitry configured to calculate a parameter correlated with a predicted output value of the fuel cell, based on the first required output and the second required output, the predicted output value being predicted as an output on the scheduled traveling route.

8 Claims, 17 Drawing Sheets

(51) Int. Cl.
  *B60L 58/40*        (2019.01)
  *B60L 58/12*        (2019.01)
(52) U.S. Cl.
  CPC ... *H01M 8/04305* (2013.01); *H01M 8/04619* (2013.01); *H01M 8/04626* (2013.01); *H01M 16/006* (2013.01); *B60L 2240/12* (2013.01); *B60L 2240/14* (2013.01); *B60L 2240/68* (2013.01); *B60L 2260/54* (2013.01); *H01M 2250/20* (2013.01); *Y02T 10/705* (2013.01); *Y02T 10/7044* (2013.01); *Y02T 10/7291* (2013.01); *Y02T 90/16* (2013.01); *Y02T 90/161* (2013.01); *Y02T 90/32* (2013.01); *Y02T 90/34* (2013.01)

(56) References Cited

U.S. PATENT DOCUMENTS

| | | | |
|---|---|---|---|
| 2012/0296605 A1* | 11/2012 | Hamzaoui | H04Q 9/00 702/184 |
| 2014/0046595 A1 | 2/2014 | Segawa et al. | |
| 2014/0107903 A1* | 4/2014 | Kawazu | F02D 41/0097 701/101 |
| 2016/0243947 A1* | 8/2016 | Perkins | B60L 1/003 |
| 2017/0080821 A1* | 3/2017 | Hughes | B60L 58/26 |
| 2017/0240181 A1* | 8/2017 | Yu | B60W 40/08 |
| 2018/0065498 A1* | 3/2018 | Grewal | B60L 11/1861 |
| 2018/0111503 A1* | 4/2018 | Araki | B60L 11/1883 |
| 2018/0111504 A1* | 4/2018 | Matsusue | B60H 1/143 |

FOREIGN PATENT DOCUMENTS

| | | |
|---|---|---|
| JP | 2005044749 A | 2/2005 |
| JP | 2005093120 A | 4/2005 |
| JP | 2007053051 A | 3/2007 |
| JP | 2007194042 A | 8/2007 |
| JP | 2014035295 A | 2/2014 |
| JP | 2016134375 A | 7/2016 |
| WO | 03052855 A2 | 6/2003 |

* cited by examiner

| SPOT | AVERAGE VEHICLE SPEED | SPOT | AVERAGE VEHICLE SPEED | SPOT | AVERAGE VEHICLE SPEED |
|---|---|---|---|---|---|
| A1 | 35 | B1 | 43 | C1 | 65 |
| A2 | 38 | B2 | 45 | C2 | 67 |
| A3 | ⋮ | B3 | ⋮ | C3 | ⋮ |
| A4 | ⋮ | B4 | ⋮ | C4 | ⋮ |
| ⋮ | ⋮ | ⋮ | ⋮ | ⋮ | ⋮ |

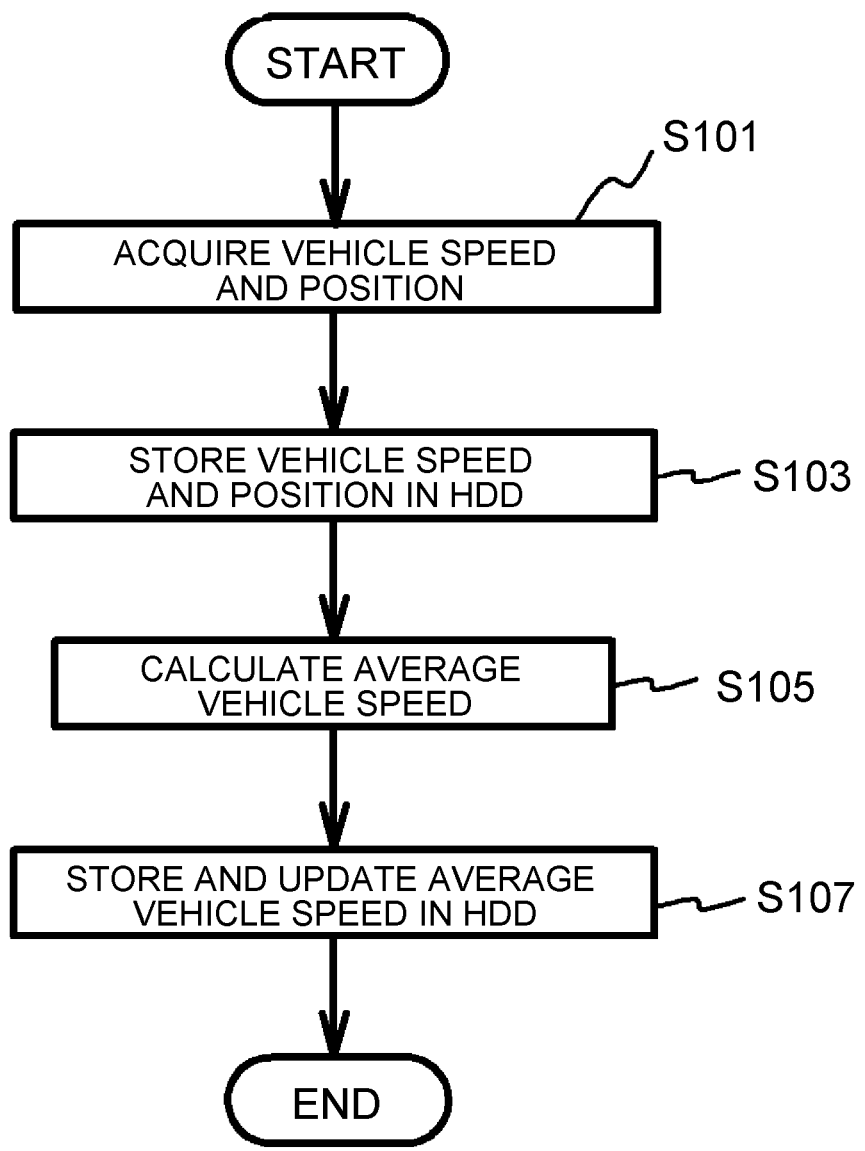

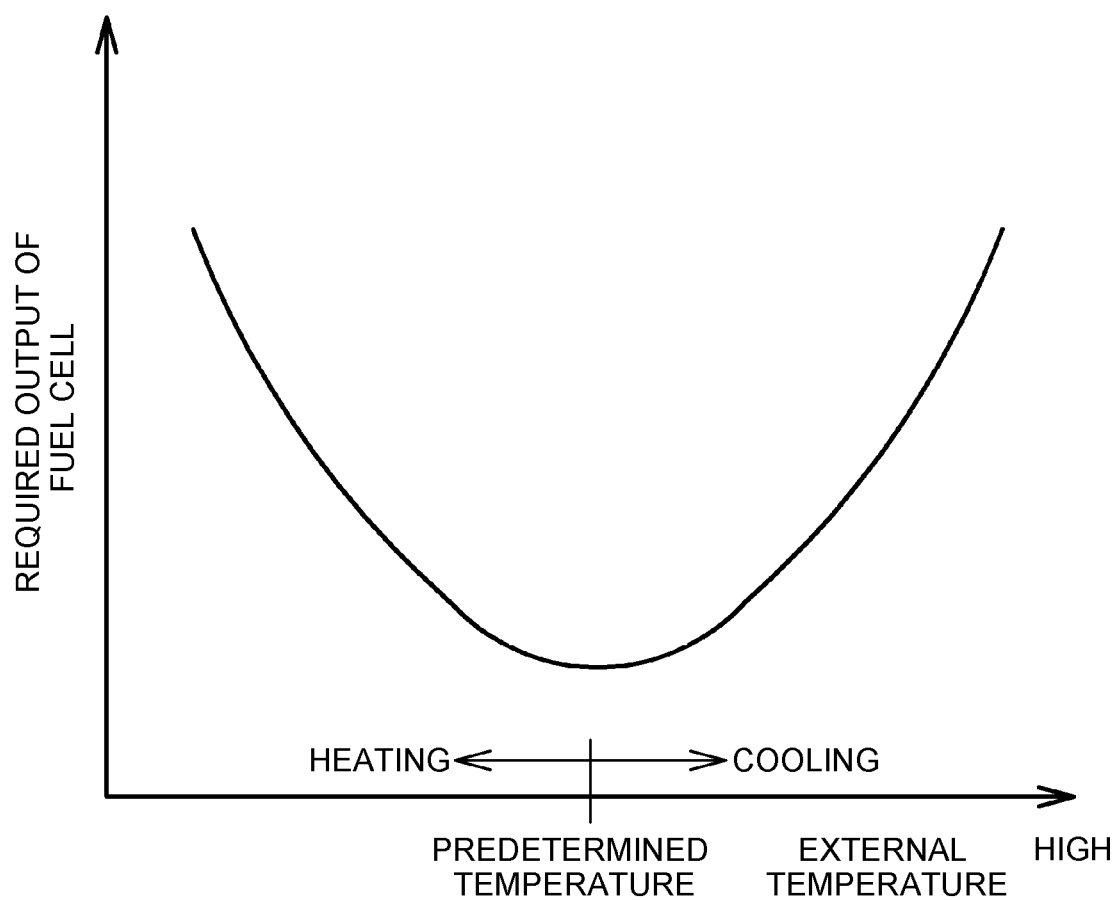

FIG. 14A

| SPOT | AVERAGE ACCELERATION | SPOT | AVERAGE ACCELERATION | SPOT | AVERAGE ACCELERATION |
|---|---|---|---|---|---|
| A1 | 3 | B1 | 8 | C1 | 12 |
| A2 | -3 | B2 | 1 | C2 | 15 |
| A3 | ⋮ | B3 | ⋮ | C3 | ⋮ |
| A4 | ⋮ | B4 | ⋮ | C4 | ⋮ |
| ⋮ | ⋮ | ⋮ | ⋮ | ⋮ | ⋮ |

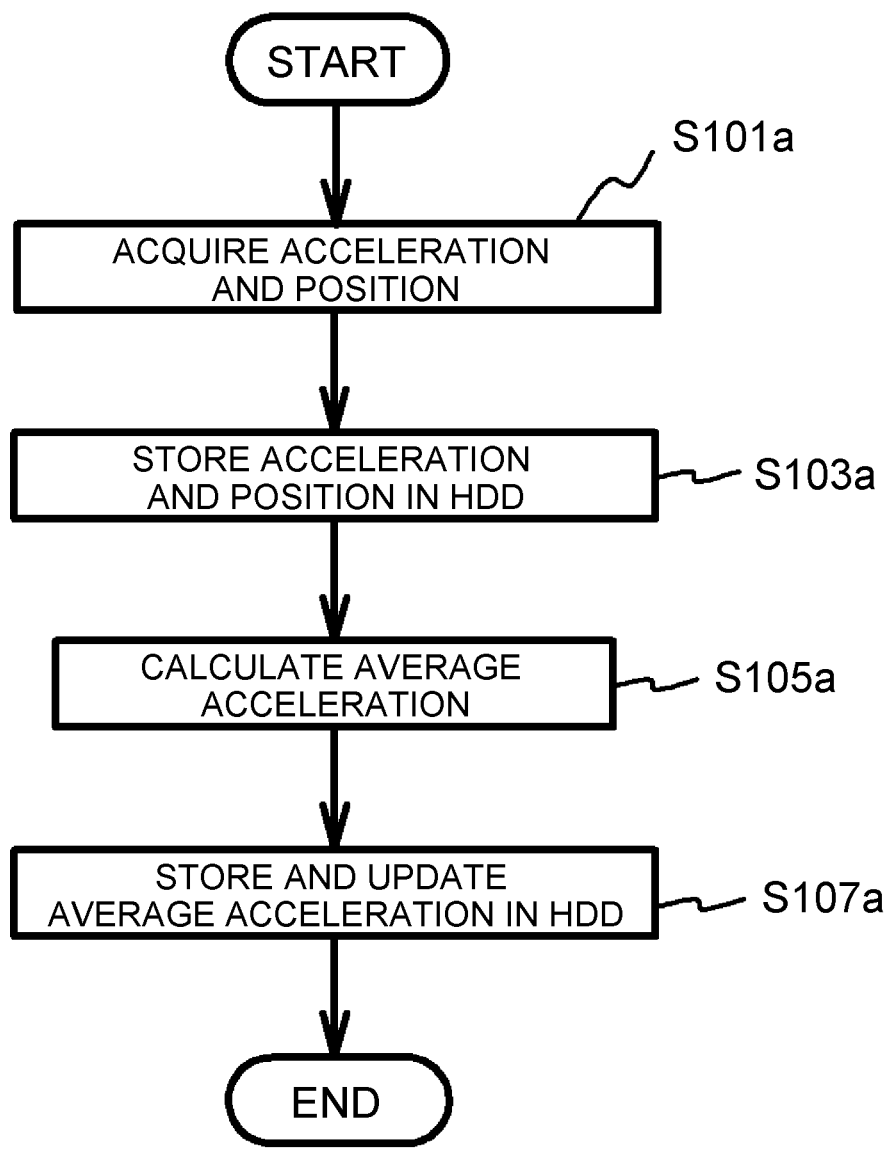

OUTPUT PREDICTION DEVICE FOR FUEL CELL, OUTPUT PREDICTION METHOD FOR FUEL CELL AND FUEL CELL SYSTEM

INCORPORATION BY REFERENCE

The disclosure of Japanese Patent Application No. 2017-013506 filed on Jan. 27, 2017 including the specification, drawings and abstract is incorporated herein by reference in its entirety.

BACKGROUND

1. Technical Field

The disclosure relates to an output prediction device for a fuel cell, an output prediction method for a fuel cell and fuel cell system.

2. Description of Related Art

There has been disclosed a technique for predicting the output of a fuel cell mounted for traveling in a vehicle, using information in a navigation device. The information in the navigation device includes a scheduled traveling route from a current place to a destination, altitude information along the scheduled traveling route, and regulation speed information (see Japanese Patent Application Publication No. 2005-044749).

SUMMARY

However, the above-described scheduled traveling route, altitude information and regulation speed information do not include information about how the vehicle travels on the scheduled traveling route. Further, the output of the fuel cell is consumed also by an air-conditioning device of the vehicle. However, the above-described information does not information about the air-conditioning device. Therefore, there is a possibility that the output of the fuel cell cannot be accurately predicted.

Hence, the disclosure provides an output prediction device for a fuel cell and an output prediction method for a fuel cell that make it possible to accurately predict the output of the fuel cell.

A first aspect of the disclosure relates to an output prediction device for a fuel cell. The output prediction device includes: a first acquisition circuitry configured to acquire a first required output of the fuel cell, the first required output being calculated based on a predicted vehicle speed or a predicted acceleration of a vehicle on a scheduled traveling route for the vehicle, the vehicle traveling by using the fuel cell as a dynamic power source; a second acquisition circuitry configured to acquire a second required output of the fuel cell, the second required output being required by an air-conditioning device of the vehicle; and a calculation circuitry configured to calculate a parameter correlated with a predicted output value of the fuel cell, based on the first required output and the second required output, the predicted output value being predicted as an output on the scheduled traveling route.

In the configuration, the parameter correlated with the predicted output value of the fuel cell is calculated from the first required output of the fuel cell that is based on the predicted vehicle speed or predicted acceleration of the vehicle and the second required output of the fuel cell that is based on the air-conditioning device of the vehicle. Therefore, the output of the fuel cell can be accurately calculated.

The first required output may be calculated further based on a grade of the scheduled traveling route.

The output prediction device may further include a charging amount alteration unit that alters a target charging amount of a secondary battery, the secondary battery compensating a shortfall of the output of the fuel cell, and when the parameter is higher than a threshold, the charging amount alteration unit previously may increase the target charging amount compared to when the parameter is equal to or lower than the threshold.

The predicted vehicle speed may be calculated based on an average vehicle speed that is an average value of traveling velocities of multiple vehicles when the multiple vehicles travel on the scheduled traveling route, the multiple vehicles including the vehicle or not including the vehicle.

The predicted acceleration may be calculated based on an average acceleration that is an average value of accelerations of multiple vehicles when the multiple vehicles travel on the scheduled traveling route, the multiple vehicles including the vehicle or not including the vehicle.

The first required output may be calculated based on the predicted vehicle speed or the predicted acceleration that is acquired from a server by wireless communication, the server being disposed outside the vehicle.

A second aspect of the disclosure relates to an output prediction method for a fuel cell. The output prediction method includes: acquiring a first required output of the fuel cell, the first required output being calculated based on a predicted vehicle speed or a predicted acceleration of a vehicle on a scheduled traveling route for the vehicle, the vehicle traveling by using the fuel cell as a dynamic power source; acquiring a second required output of the fuel cell, the second required output being required by an air-conditioning device of the vehicle; and calculating a parameter correlated with a predicted output value of the fuel cell, based on the first required output and the second required output, the predicted output value being predicted as an output on the scheduled traveling route.

A third aspect of the disclosure relates to a fuel cell system. The fuel cell system includes: a fuel cell; and a control circuitry configured to control an output of the fuel cell, based on a parameter correlated with a predicted output value of the fuel cell, the predicted output value being predicted as the output of the fuel cell on a scheduled traveling route for a vehicle and being calculated based on a first required output of the fuel cell and a second required output of the fuel cell, the first required output being calculated based on a predicted vehicle speed or a predicted acceleration of the vehicle on the scheduled traveling route for the vehicle, the second required output being required by an air-conditioning device of the vehicle, the vehicle traveling by using the fuel cell as a dynamic power source.

It is possible to provide an output prediction device for a fuel cell, an output prediction method for a fuel cell and a fuel cell system that make it possible to accurately predict the output of the fuel cell.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 4A is a flowchart showing an exemplary control for controlling an average vehicle speed;

FIG. 8 is a map specifying a relation between a required output of the fuel battery required by the air-conditioning device and external temperature;

FIG. 14A shows exemplary average accelerations stored in the HDD of the server;

FIG. 14B is a flowchart showing an exemplary control for calculating an average acceleration.

DETAILED DESCRIPTION OF EMBODIMENTS

Figure 1:
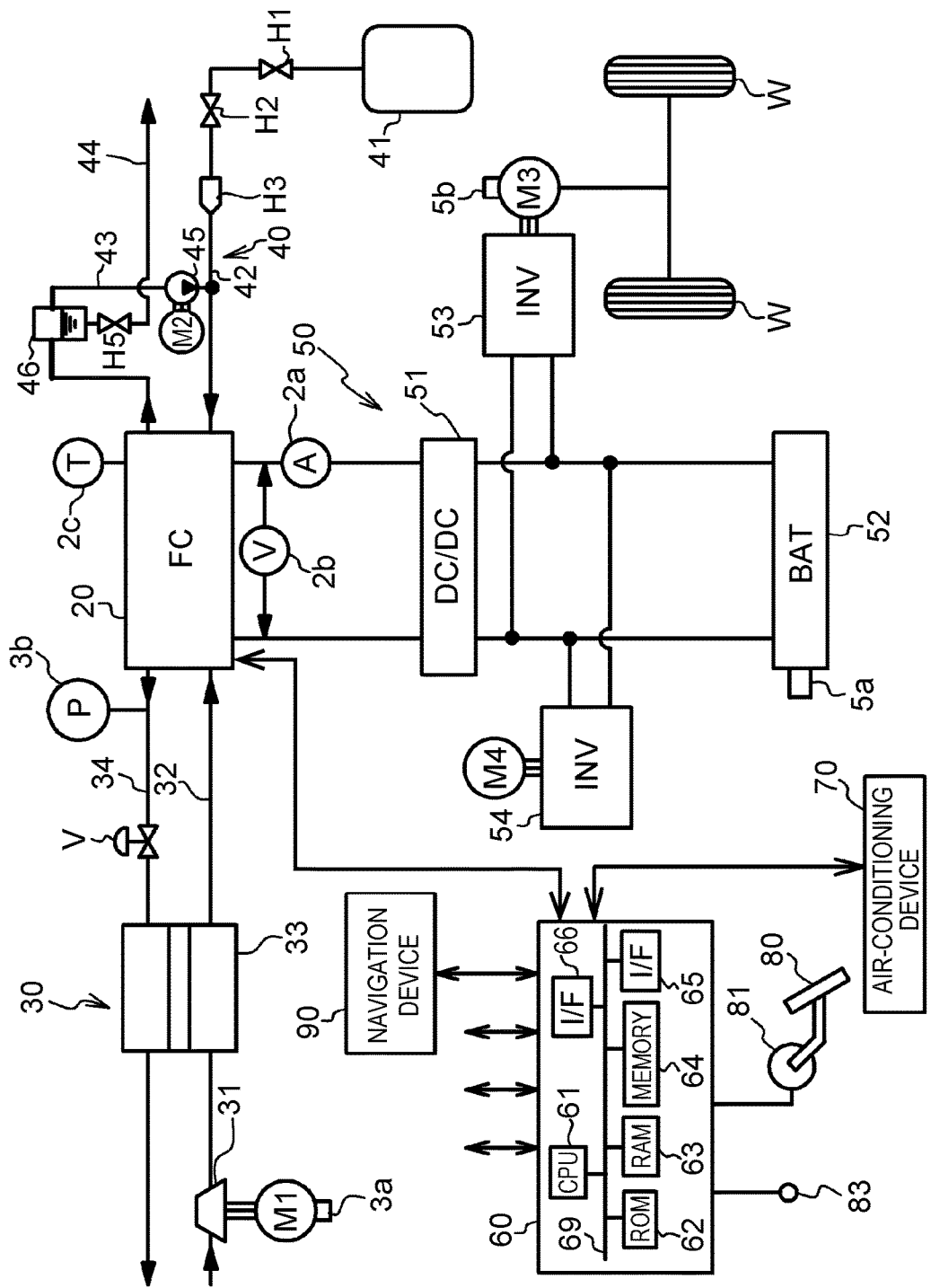
FIG. 1 is a configuration diagram of vehicle.

FIG. 1 is a configuration diagram of a fuel cell vehicle (hereinafter, referred to as a vehicle). As shown in FIG. 1, a vehicle 1 includes an oxidant gas piping system 30, a fuel gas piping system 40, an electric power system 50, and a control device 60. A fuel cell 20 generates electric power by receiving the supply of an oxidant gas and a fuel gas. The oxidant gas piping system 30 supplies an oxygen-containing air as the oxidant gas, to the fuel cell 20. The fuel gas piping system 40 supplies hydrogen gas as the fuel gas, to the fuel cell 20. The electric power system 50 charges and discharges systems with electric power. The control device 60 integrally controls the whole of the vehicle 1. The fuel cell 20 is a solid polymer electrolyte type fuel cell, and has a stack structure in which a plurality of cells are stacked. The fuel cell 20 is equipped with a current sensor 2a and a voltage sensor 2b that detect output current and output voltage respectively, and a temperature sensor 2c that detects the temperature of the fuel cell 20.

The oxidant gas piping system 30 includes an air compressor 31, an oxidant gas supply channel 32, a humidifying module 33, an oxidant off-gas flow channel 34, and a motor M1 that drives the air compressor 31. The air compressor 31, which is driven by the motor M1, compresses the oxygen-containing air (oxidant gas) taken from external air, and then, supplies the oxygen-containing air to a cathode electrode of the fuel cell 20. The motor M1 is equipped with a rotational speed detection sensor 3a that detects the rotational speed of the motor M1. The oxidant gas supply channel 32 leads the air supplied from the air compressor 31, to the cathode electrode of the fuel cell 20. From the cathode electrode of the fuel cell 20, an oxidant off-gas is ejected through the oxidant off-gas flow channel 34. The humidifying module 33 moderately humidifies the oxidant gas supplied to the fuel cell 20. The oxidant off-gas flow channel 34 evacuates the oxidant off-gas to the exterior of the system, and a back pressure regulating valve V is provided near an outlet of the cathode electrode. A pressure sensor 3b that detects cathode back pressure is equipped between the fuel cell 20 and the back pressure regulating valve V on the oxidant off-gas flow channel 34.

The fuel gas piping system 40 includes a fuel tank 41, a fuel gas supply channel 42, a fuel gas circulation channel 43, an anode off-gas flow channel 44, a hydrogen circulation pump 45, a gas-liquid separator 46, and a motor M2 for driving the hydrogen circulation pump 45. The fuel tank 41 is a tank for supplying hydrogen gas that is a fuel gas, to the fuel cell 20. The fuel gas supply channel 42 leads the fuel gas released from the fuel tank 41, to the anode side of the fuel cell 20, and a tank valve H1, a hydrogen pressure regulating valve H2 and an injector H3 are provided in the order from the upstream side. The valves and the injector supply or block the fuel gas to the fuel cell 20. The fuel gas circulation channel 43 returns unreacted fuel gas to the fuel cell 20, and the gas-liquid separator 46, the hydrogen circulation pump 45 and an unillustrated check valve are provided in the order from the upstream side. The unreacted fuel gas ejected from the fuel cell 20 is moderately pressurized by the hydrogen circulation pump 45, and led to the fuel gas supply channel 42. The anode off-gas flow channel 44 evacuates a hydrogen off-gas-containing anode off-gas ejected from the fuel cell 20 and water stored in the gas-liquid separator 46, to the exterior of the system, and an evacuation-drain valve H5 is provided.

The electric power system 50 includes a high-voltage DC-DC converter 51, a battery 52, a traction inverter 53, an auxiliary machine inverter 54, a traction motor M3, and an auxiliary machine motor M4. The high-voltage DC-DC converter 51 can regulate a direct-current voltage from the fuel cell 20, to output the direct-current voltage to the battery 52. The output voltage of the fuel cell 20 is controlled by the high-voltage DC-DC converter 51. The battery 52 is a secondary battery that can be charged and discharged, and allows a charge with surplus electric power and an auxiliary electric power supply. Some of the direct-current power generated in the fuel cell 20 is increased or decreased by the high-voltage DC-DC converter 51, and then, the battery 52 is charged with the direct-current power. The battery 52 is equipped with an SOC sensor 5a that detects the state-of-charge of the battery 52. The traction inverter 53 and the auxiliary machine inverter 54 convert the direct-current power output from the fuel cell 20 or the battery 52, into three-phase alternating-current power, and then, supplies the three-phase alternating-current power to the traction motor M3 and the auxiliary machine motor M4. The traction motor M3 drives wheels W. When the traction motor M3 performs regeneration, electric power output from the traction motor M3 is converted into direct-current power by the traction inverter 53, and then, the battery 52 is charged with the direct-current power. The traction motor M3 is equipped with a rotational speed detection sensor 5b that detects the rotational speed of the traction motor M3.

In the vehicle 1, an air-conditioning device 70 capable of cooling and heating a vehicle cabin is mounted. The air-conditioning device 70 will be described later in detail.

The control device 60 includes a CPU (Central Processing Unit) 61, a ROM (Read Only Memory) 62, a RAM (Random Access Memory) 63, a memory 64, a network interface 65, an input-output interface 66, and the like, and the parts are connected by a bus 69. Further, the control device 60 integrally controls the parts of the system, based on sensor signals to be input. Specifically, through the input-output interface 66, the CPU 61 of the control device 60 controls the electric power generation in the fuel cell 20, based on sensor signals to be sent from an accelerator pedal sensor 81 that detects a turn of an accelerator pedal 80, a vehicle speed sensor 83, the SOC sensor 5a and the rotational speed detection sensor 5b. Further, to the input-output interface 66, a navigation device 90 and the air-conditioning device 70 are connected. Map data, a past traveling history of the vehicle 1 and the like are stored in a storage device of the navigation device 90. The navigation device 90 incorporates a GPS (Global Positioning System) receiver that acquires positional information of the vehicle 1. By the network interface 65, the CPU 61 of the control device 60 can perform wireless communication with a server 100 through a network N described later.

The control device 60 can execute an output prediction control for predicting the output of the fuel cell 20. The output prediction control is executed by a first acquisition unit, a second acquisition unit and a calculation unit that are functionally realized by the CPU 61, ROM 62, RAM 63 and memory 64 of the control device 60. Accordingly, the control device 60 is an example of the output prediction device for the fuel cell 20. In the present specification, the output of the fuel cell 20 means the output electric power that is generated by the fuel cell 20.

Figure 2:
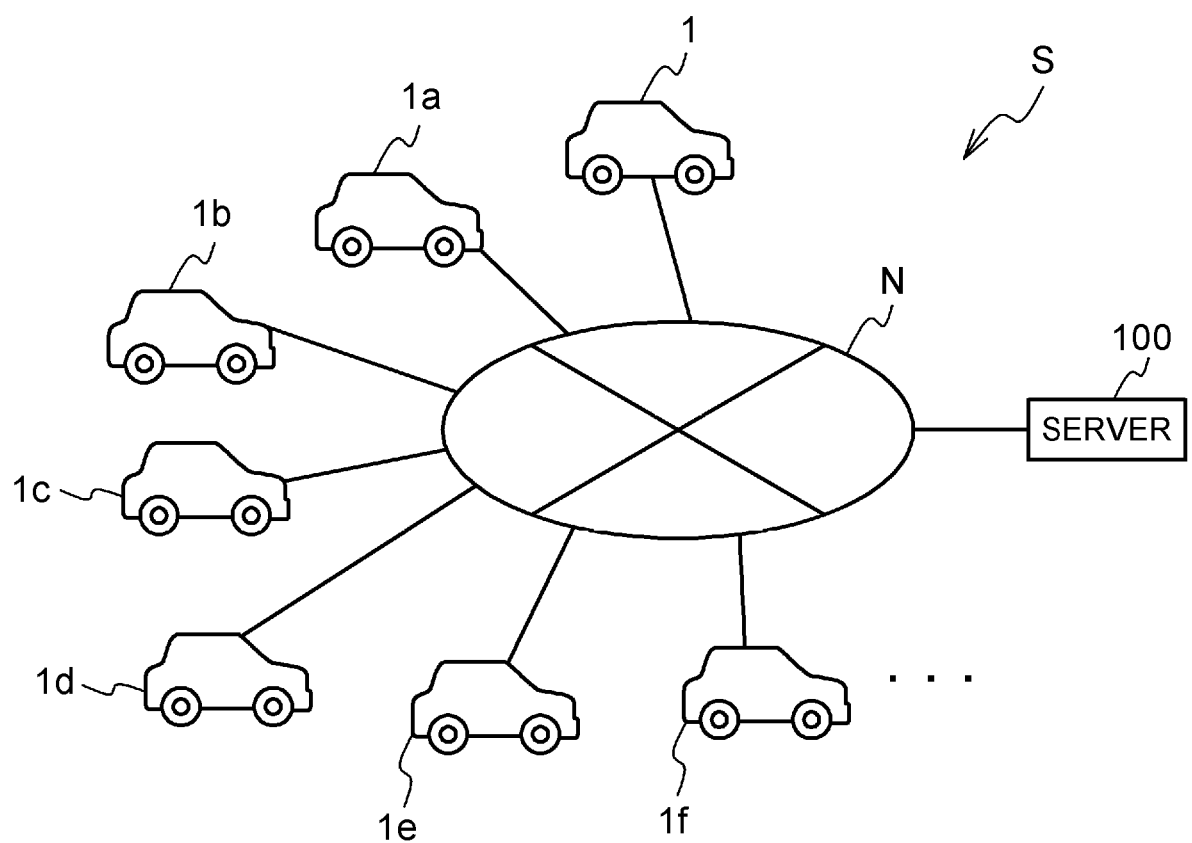
FIG. 2 is a configuration diagram of an output prediction system.

FIG. 2 is a configuration diagram of an output prediction system S. In the output prediction system S, multiple vehicles and a server 100 are connected to the network N such as the internet. Specifically, control devices respectively mounted in vehicles 1, 1a, 1b, 1c, 1d, 1e, 1f . . . are connected to the network N. Here, the vehicles 1a to 1f and the like other than the vehicle 1 are, for example, multiple vehicles such as engine vehicles, hybrid vehicles, electric vehicles and fuel cell vehicles. To the server 100, each positional information and each vehicle speed of the vehicles 1 to 1f and the like are wirelessly sent in association with each other, from each control device of the vehicles 1 to 1f through the network N.

Figures 3A, 3B:
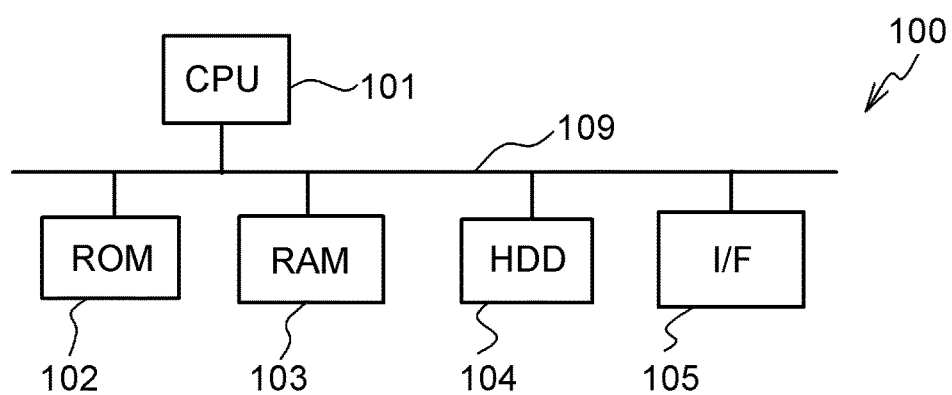
FIG. 3A is a configuration diagram of a server.
FIG. 3B shows exemplary average vehicle speeds stored in a HDD of the server.

Next, the server 100 will be described. FIG. 3A is a configuration diagram of the server 100. The server 100 includes a CPU 101, a ROM 102, a RAM 103, a HDD (Hard Disk Drive) 104, a network interface 105 and the like, and the parts are connected by a bus 109. In the server 100, the CPU 101 executes a program stored in the ROM 102 or the HDD 104, and thereby, various functions are realized. The network interface 105 can communicate with the control device 60 of the vehicle 1, and can also communicate with each control device of the vehicles 1a to 1f and the like other than the vehicle 1. In the HDD 104, there are stored the positional information and vehicle speed information of each vehicle that are acquired from the multiple vehicles and an average vehicle speed at each spot. Without being limited to the HDD 104, another storage device may be used as long as the pieces of information can be stored. Here, the average vehicle speed is an average value of the traveling velocities of the multiple vehicles including the vehicles 1 to 1f and the like when the multiple vehicles travel through the spot. FIG. 3B shows exemplary average vehicle speeds stored in the HDD 104. In FIG. 3B, for each of the spots A1, A2, A3, A4 . . . , B1, B2, B3, B4 . . . , C1, C2, C3, C4, . . . , the average vehicle speed is calculated.

Next, a control for calculating the average vehicle speed will be described. The control for calculating the average vehicle speed is executed by the server 100. FIG. 4A is a flowchart showing an exemplary control for calculating the average vehicle speed. The control is repeatedly executed with a constant period. The control is repeatedly executed with a constant period. First, from a plurality of vehicles, the current position of each vehicle and the vehicle speed at the position are acquired through the network N (step S101). For example, the current position of the vehicle is acquired based on the positional information from the GPS receiver mounted in each vehicle. As the vehicle speed of each vehicle, the information from the vehicle speed sensor mounted in each vehicle is acquired. Next, the acquired position and vehicle speed are stored in the HDD 104, in association with each other (step S103). Next, based on a plurality of vehicle speeds acquired for an identical spot, the average vehicle speed, which is the average value of the vehicle speeds, is calculated (step S105). The calculated average vehicle speed is stored and updated in the HDD 104, in association with the spot (step S107). Accordingly, the average vehicle speed at each spot is the average vehicle speed of multiple vehicles including the vehicle 1 if the vehicle 1 has traveled through the spot, and is the average vehicle speed of multiple vehicles not including the vehicle 1 if the vehicle 1 has not traveled through the spot.

Figure 4B:
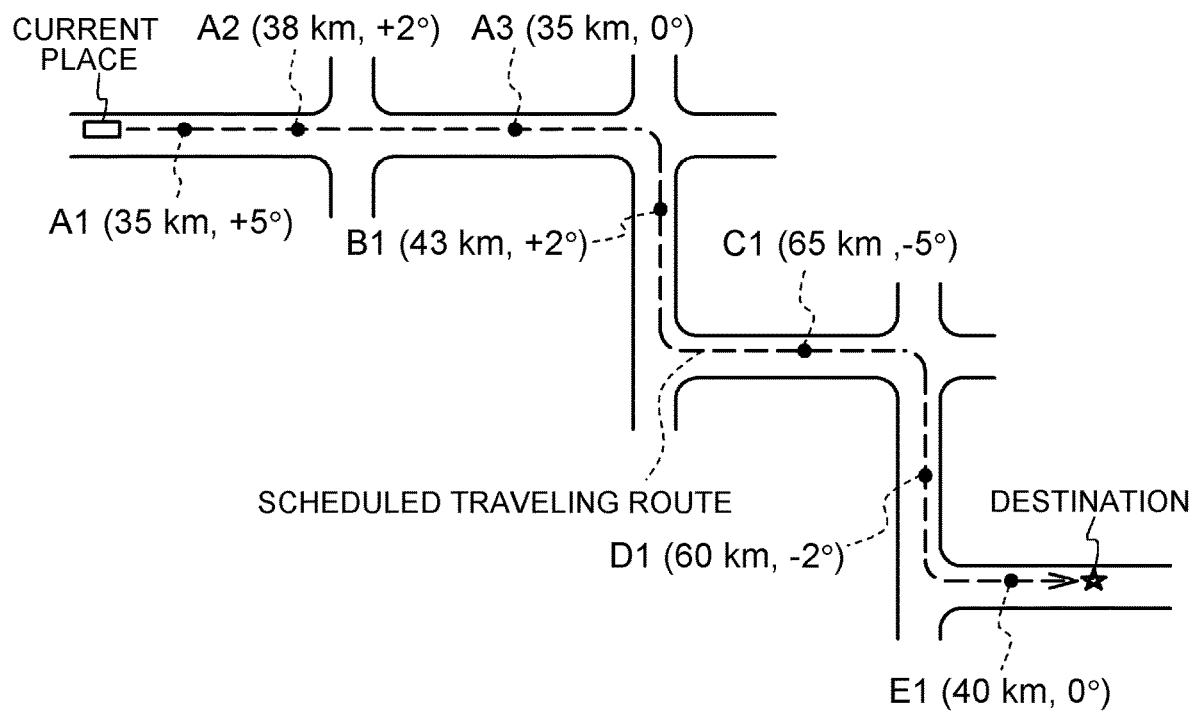
FIG. 4B is a conceptual diagram showing average vehicle speeds and grades at spots on a scheduled traveling route.

Next, a control that is executed by the control device 60 of the vehicle 1 will be described. The control device 60 of the vehicle 1 acquires, from the server 100, the average vehicle speed at each spot on a scheduled traveling route from the current place of the vehicle 1 to a destination. The scheduled traveling route is a route that is shown by the navigation device 90 from the current place of the vehicle 1 to a destination set in the navigation device 90 by a user, and or a route that is estimated from the past traveling history stored in the navigation device 90 when the destination is not set. The control device 60 acquires a scheduled traveling route from the navigation device 90. Further, the control device 60 acquires the grade of a road at each spot that is on the scheduled traveling route and for which the average vehicle speed is acquired, from the map data stored in the navigation device 90. FIG. 4B is a conceptual diagram showing the average vehicle speeds and grades at spots A1 to A3, B1, C1, D1, E1 on the scheduled traveling route. Based on the average vehicle speeds and grades at the spots, the control device 60 calculates a required output of the fuel cell 20 on the scheduled traveling route.

Figure 5:
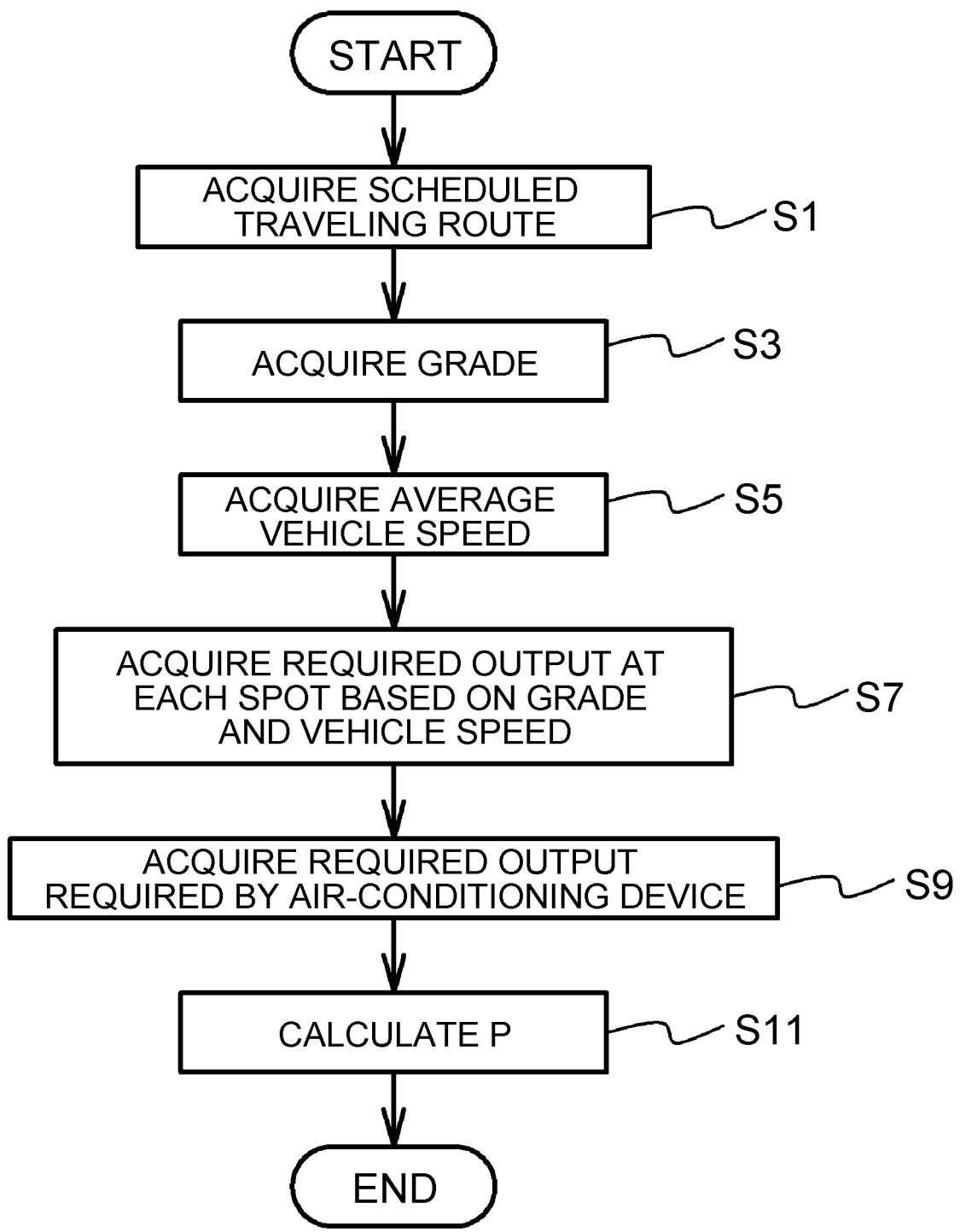
FIG. 5 is a flowchart showing an exemplary output prediction control in an embodiment.

Next, the output prediction control that is executed by the control device 60 will be specifically described. FIG. 5 is a flowchart showing an exemplary output prediction control in the embodiment. The output prediction control is repeatedly executed with a predetermined period.

First, the scheduled traveling route is acquired from the navigation device 90, as described above (step S1). Next, the grade at each spot on the scheduled traveling route is acquired from the map information of the navigation device 90 (step S3). Next, the average vehicle speed at each spot on the scheduled traveling route is acquired from the server 100 (step S5). The average vehicle speed is acquired as an example of the predicted vehicle speed of the vehicle 1 that travels on the scheduled traveling route. Instead of the predicted vehicle speed, a predicted acceleration may be used. An example in which the predicted acceleration is used will be described later.

Figure 6:
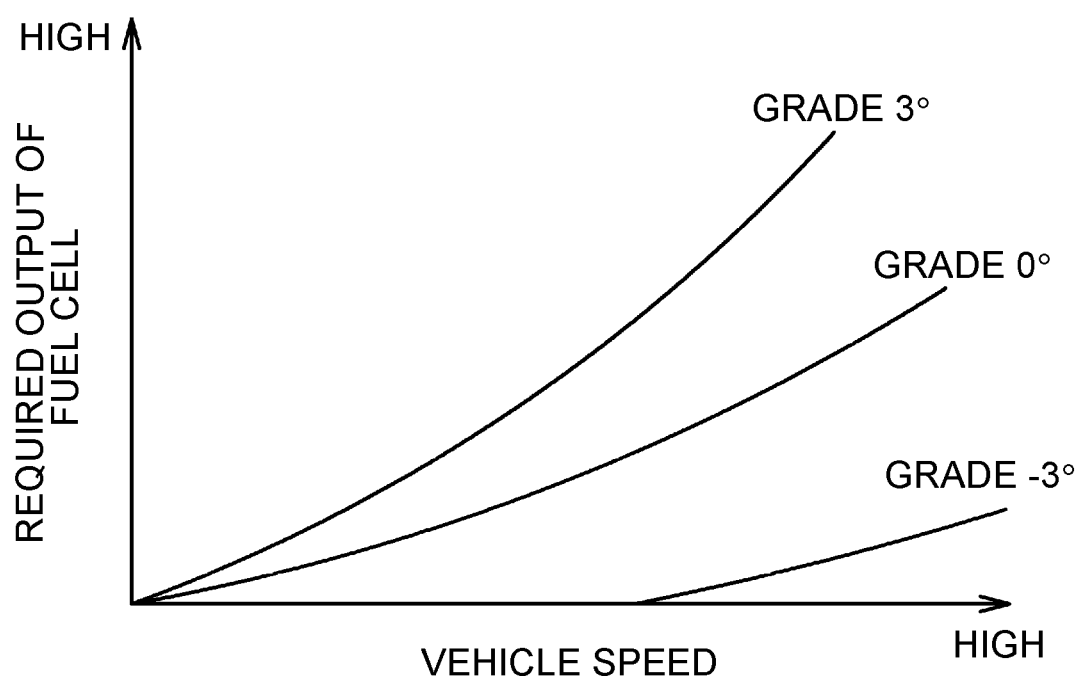
FIG. 6 is a map specifying a required output of a fuel cell for each vehicle speed and each grade.

Next, the required output of the fuel cell 20 at each spot is calculated and acquired based on the acquired grade and average vehicle speed (step S7). The required output herein is a required output that is required in the fuel cell 20 for allowing the vehicle 1 to travel through a predetermined spot having a predetermined grade at the average vehicle speed for the spot. Specifically, the required output of the fuel cell 20 can be regarded as being nearly the same as an electric power value that is needed for realizing the above traveling and that is consumed by the traction motor M3, the auxiliary machine motor M4 and the like. FIG. 6 is a map specifying the required output of the fuel cell 20 for each vehicle speed and each grade. The map is previously calculated based on experiments, and is stored in the memory 64 of the control device 60. The required output of the fuel cell 20 increases as the vehicle speed increases, and increases as up-grade increases. In the case of down-grade, the required output of the fuel cell 20 is zero at a predetermined vehicle speed or lower. The section where the required output is zero increases as the inclination angle of the down-grade increases. By referring to the map, the required output of the fuel cell 20 at each spot on the scheduled traveling route is calculated. Step S7 is an example of a process to be executed by the first acquisition unit that acquires a first required output of the fuel cell 20 calculated based on the predicted vehicle speed or predicted acceleration of the vehicle 1, which travels by using the fuel cell 20 as a dynamic power source, on the scheduled traveling route for the vehicle 1.

Next, the required output of the fuel cell 20 that is required by the air-conditioning device 70 is acquired (step S9). Step S9 is an example of a process to be executed by the second acquisition unit that acquires a second required output of the fuel cell 20 required by the air-conditioning device 70 of the vehicle 1. Before the process will be described in detail, a configuration of the air-conditioning device 70 will be described.

Figure 7A:
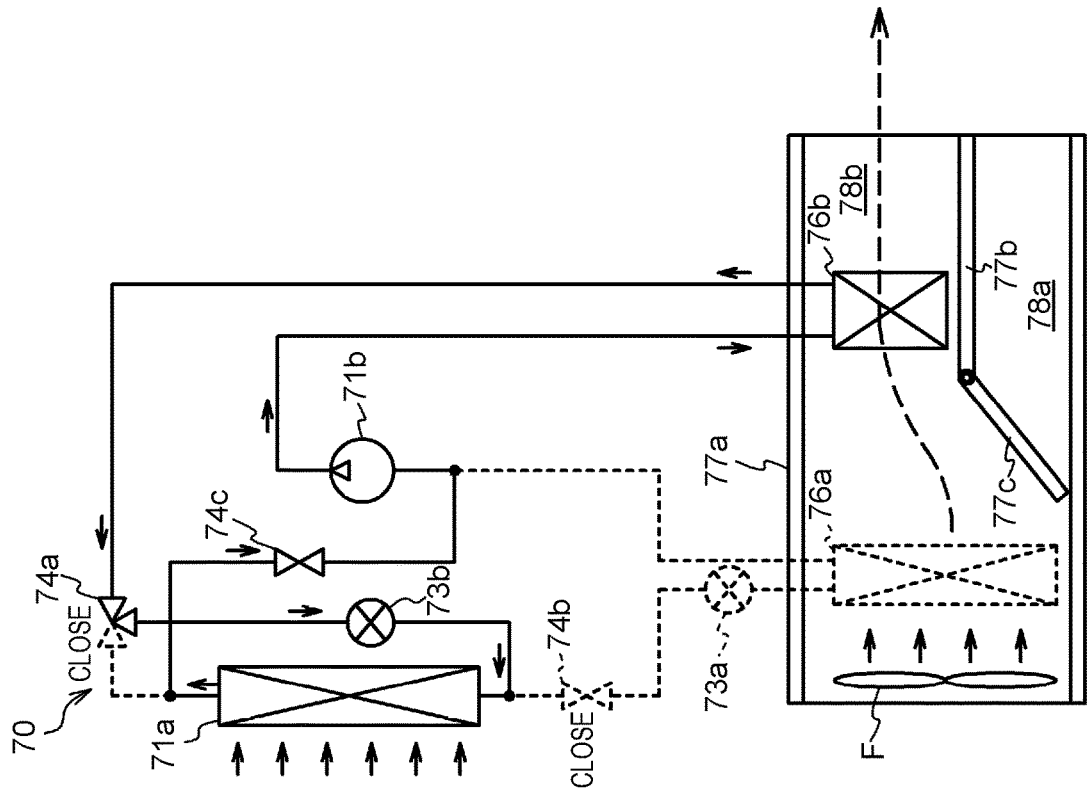
FIG. 7A shows a state of an air-conditioning device at the time of cooling.
Figure 7B:
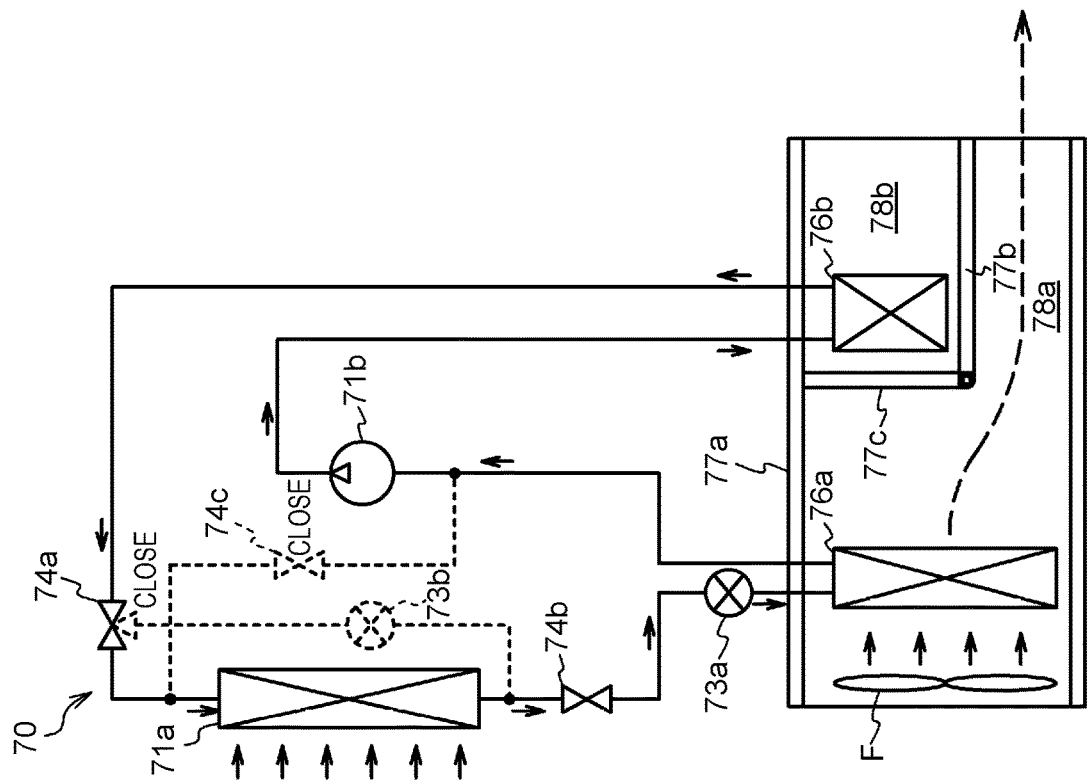
FIG. 7B shows a state of the air-conditioning device at the time of heating.

FIG. 7A and FIG. 7B show states of the air-conditioning device 70 at the time of cooling and at the time of heating, respectively. The air-conditioning device 70 includes an air-conditioner compressor 71b, an evaporator 76a, an internal condenser 76b, and the like, and they are connected by pipes through which a refrigerant flows. At the time of cooling, open-close states of a three-way valve 74a and on-off valves 74b, 74c are controlled such that the refrigerant circulates as follows. As shown in FIG. 7A, the refrigerant in gas phase is condensed by the air-conditioner compressor 71b, and passes through the internal condenser 76b and the three-way valve 74a, under high temperature and high pressure. The refrigerant is cooled through the heat exchange with the external air by an external heat exchanger 71a, to become liquid phase. Then, the refrigerant is injected to the evaporator 76a by an expansion valve 73a, and is evaporated. On that occasion, the refrigerant exchanges heat with air sent from a fan F. The cold air after the heat exchange is sent to the vehicle cabin through a duct 77a communicated with the vehicle cabin, in a state where a shutter 77c, partitioned by a partition wall 77b, opens an air duct 78a for cooling and closes an air duct 78b for heating.

At the time of heating, the open-close states of the three-way valve 74a and the on-off valves 74b, 74c are controlled such that the refrigerant circulates as follows. As shown in FIG. 7B, the refrigerant in gas phase is condensed by the air-conditioner compressor 71b, and exchanges heat with air sent from the fan F, in the internal condenser 76b, under high temperature and high pressure. The hot air after the heat exchange is sent to the vehicle cabin, in a state where the shutter 77c closes the air duct 78a and opens the air duct 78b. The refrigerant liquefied in the internal condenser 76b passes through the three-way valve 74a, and becomes a mist condition through the expansion valve 73b. Then, the refrigerant flows into the external heat exchanger 71a, and exchanges heat with the external air when being evaporated in the external heat exchanger 71a. The evaporated refrigerant is condensed by the air-conditioner compressor 71b again.

The required output of the fuel cell 20 that is required by the air-conditioning device 70 is calculated based on external temperature. FIG. 8 is a map specifying a relation between a required output of the fuel cell 20 required by the air-conditioning device 70 and the external temperature. The map is previously calculated based on experiments, and is stored in the memory 64 of the control device 60. The map specifies the required output of the fuel cell 20 required by the air-conditioning device 70, when the temperature of the vehicle cabin is maintained at a predetermined temperature, for example, 25 degrees, and the required output varies depending on the external temperature. As the difference between the predetermined temperature and the external temperature becomes larger, it is necessary to increase the flow rate of the refrigerant that is carried by the air-conditioner compressor 71b, the electric power consumption of the air-conditioner compressor 71b increases, and therefore, the required output of the fuel cell 20 also increases. The external temperature means the external temperature around the vehicle 1, and the control device 60 acquires the external temperature from an external temperature sensor mounted on the vehicle 1.

Next, a predicted output value P that is predicted as an output of the fuel cell 20 after the current time point and before the elapse of a predetermined time, specifically, before the elapse of 30 minutes is calculated based on the grade and average vehicle speed at each spot on the scheduled traveling route and the required output of the fuel cell 20 required by air-conditioning device 70 (step S11). In detail, the value resulting from adding the required output of the fuel cell 20 required by the air-conditioning device 70 to the required output of the fuel cell 20 at each spot based on the grade and the vehicle speed is calculated as the predicted output value P of the fuel cell 20 at each spot. Step S11 is an example of a process to be executed by the calculation unit that calculates a parameter correlated with the predicted output value of the fuel cell 20 that is predicted as an output on the scheduled traveling route, based on the predicted vehicle speed or predicted acceleration and the required output of the fuel cell 20 required by the air-conditioning device 70. The predicted output value P of the fuel cell 20 is an example of the parameter correlated with the predicted output value of the fuel cell 20.

Figure 9:
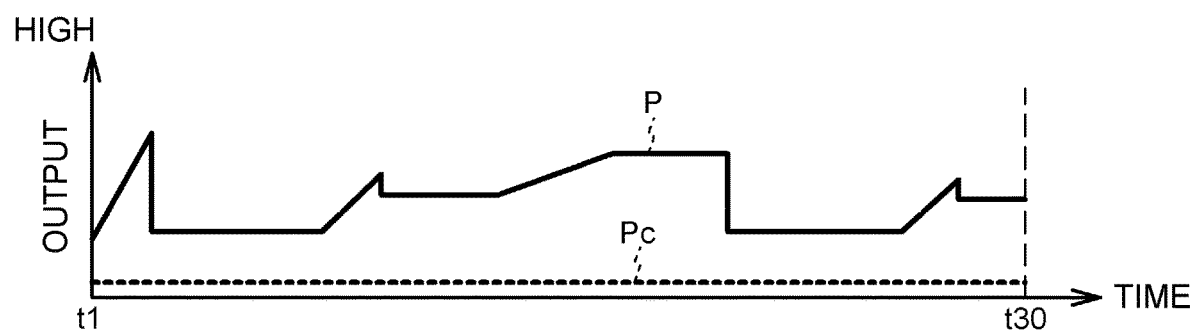
FIG. 9 is an exemplary graph showing a transition of a predicted output value.

FIG. 9 is an exemplary graph showing a transition of the calculated predicted output value P. Time t1 indicates the current time, and time t30 indicates a time after 30 minutes from time t1. In FIG. 9, there is shown an output value Pc of the fuel cell 20 that is consumed by the air-conditioning device 70. The output value Pc corresponds to the above-described second required output. The predicted output value P corresponds to the total of the above-described first and second required outputs.

In this way, when the predicted output value of the fuel cell 20 is calculated, the required output of the fuel cell 20 required by the air-conditioning device 70 is considered in addition to the grade and predicted vehicle speed on the scheduled traveling route, and therefore, the predicted output value P of the fuel cell 20 can be calculated more accurately.

The control device 60 of the vehicle 1 may use the predicted output value P calculated in this way, for the first determination of whether a predetermined process is executed. For example, the control device 60 may perform a control such that a predetermined process is executed when the predicted output value P is relatively large, and the process is not executed when the predicted output value P is relatively small.

In the embodiment, the transition of the predicted output value P after the current time point and before the elapse of a predetermined time is predicted, but the disclosure is not limited to this. For example, the average value of the predicted output value P after the current time point and before the elapse of a predetermined time may be predicted. For example, the average value of the predicted output value P may be calculated by dividing the total value of the predicted output values P at spots in a period after the current time point and before the elapse of a predetermined time by the number of the spots. Further, the maximum value of the predicted output value P after the current time point and before the elapse of a predetermined time may be predicted. Further, the integrated value of the predicted output value P after the current time point and before the elapse of a predetermined time may be predicted. Each of the average value, the maximum value and the integrated value increases as the predicted output value increases, and is an example of the parameter correlated with the predicted output value. The parameter can be accurately calculated, and therefore, the output of the fuel cell 20 can be accurately calculated. The average value, the maximum value and the integrated value may be also used for the determination of whether a predetermined process is executed.

The control device 60 of the vehicle 1 and the server 100 may execute the output prediction control shown in FIG. 5, in cooperation. For example, the server 100 may execute steps S1 to S7, and the control device 60 may execute steps S9 to S11. In this case, the server 100 may execute steps S1 to S5 and further calculate the required output of the fuel cell 20 based on the predicted vehicle speed and the like, and the control device 60 of the vehicle 1 may acquire the calculated required output by wireless communication.

Further, steps S1 to S11 may be executed by the server 100. In this case, the map in FIG. 8 is stored in the HDD 104 of the server 100, in association with the identification information of the vehicle, for each vehicle type. The server 100 corresponds to the above-described output prediction device of the fuel cell 20 that includes the first acquisition unit, the second acquisition unit and the calculation unit. The control device 60 may refer to the identification information of the vehicle 1 and the identification information stored in the HDD 104, may acquire the predicted output value P calculated by the server 100, and may determine whether a predetermined process is executed, depending on the predicted output value P.

Next, modifications of the output prediction control will be described. In the modifications of the output prediction control, for identical processes, identical reference characters are used, and thereby, repetitive descriptions are omitted. An output prediction control in a first modification will be described. In a first modification, a target charging amount of the battery 52 is increased when a predetermined condition is satisfied. An output prediction control in the first modification is executed by the first acquisition unit, the second acquisition unit, the calculation unit and a charging amount alteration unit that are functionally realized by the CPU 61, ROM 62, RAM 63 and memory 64 of the control device 60.

Figure 10:
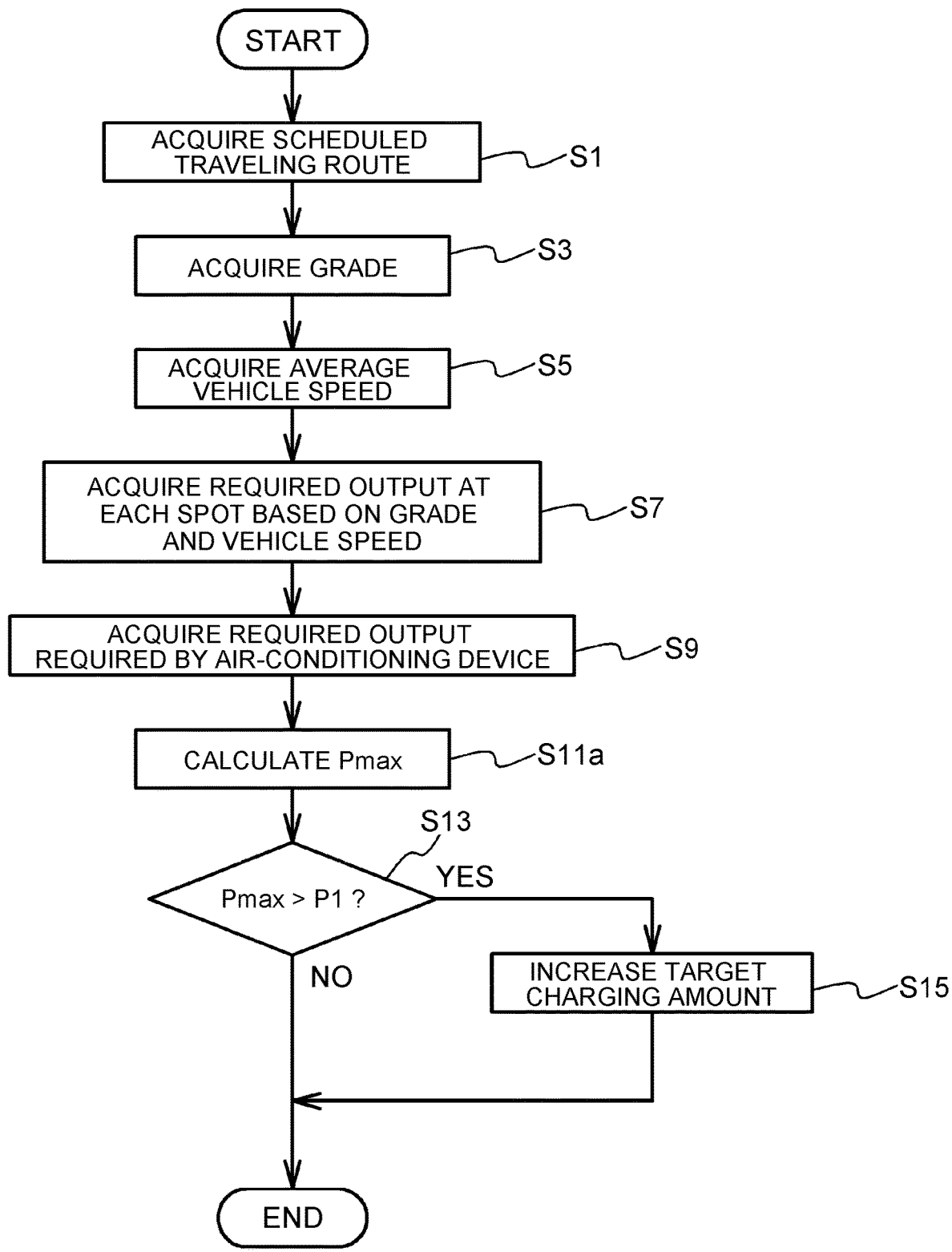
FIG. 10 is a flowchart showing an exemplary output prediction control in a first modification.

FIG. 10 is a flowchart showing an exemplary output prediction control in the first modification. In the first modification, a maximum value Pmax of the predicted output value P in a period after the current time point and before the elapse of a predetermined time, specifically, before the elapse of 30 minutes is calculated (step S11a). Next, whether the maximum value Pmax is higher than a threshold P1 is determined (step S13). In the case of the negative determination, the control is ended. In the case of the positive determination, the target charging amount of the battery 52 is increased by a predetermined amount (step S15), and the control is ended. Step S15 is an example of a process to be executed by the charging amount alteration unit that alters the target charging amount of the battery 52 to compensate a shortfall of the output of the fuel cell 20.

Here, the case of the positive determination in step S13 is a case where it is predicted that the required output of the fuel cell 20 will increase. In the case of such a prediction, the target charging amount of the battery 52 is temporarily increased, allowing the compensation of the output of the fuel cell 20 by the battery 52.

In the first modification also, the control device 60 and the server 100 may execute the steps in cooperation. For example, the server 100 may execute steps S1 to S7, and the control device 60 of the vehicle 1 may execute step S9 and the subsequent processes. Further, the server 100 may execute steps S1 to S11a, and the control device 60 of the vehicle 1 may execute steps S13 and S15.

The server 100 may execute steps S1 to S13, and the control device 60 of the vehicle 1 may execute step S15. In this case, the threshold P1 is stored in the HDD 104 of the server 100, in association with the identification information of the vehicle, for each vehicle type. The control device 60 refers to the identification information of the vehicle 1 and the identification information stored in the HDD 104, and acquires the determination result in step S13 that is determined by the server 100.

In steps S11a and S13 in the first modification, the maximum value Pmax is used, but the disclosure is not limited to this. For example, the average value of the predicted output value P in a predetermined period may be calculated, and whether the average value is exceeding a predetermined threshold may be determined. Whether an accumulated time for which the predicted output value P in a predetermined period is exceeding a predetermined threshold is exceeding a predetermined time may be determined. Whether the area of a region surrounded by a locus of the predicted output value P and a line segment indicating a predetermined output value in a range in which the locus of the predicted output value P in a predetermined period is exceeding the line segment is exceeding a predetermined threshold may be determined. Each of the maximum value, the average value, the accumulated time and the area increases as the predicted output value of the fuel cell 20 becomes larger, and is an example of the parameter correlated with the predicted output value.

Figure 11:
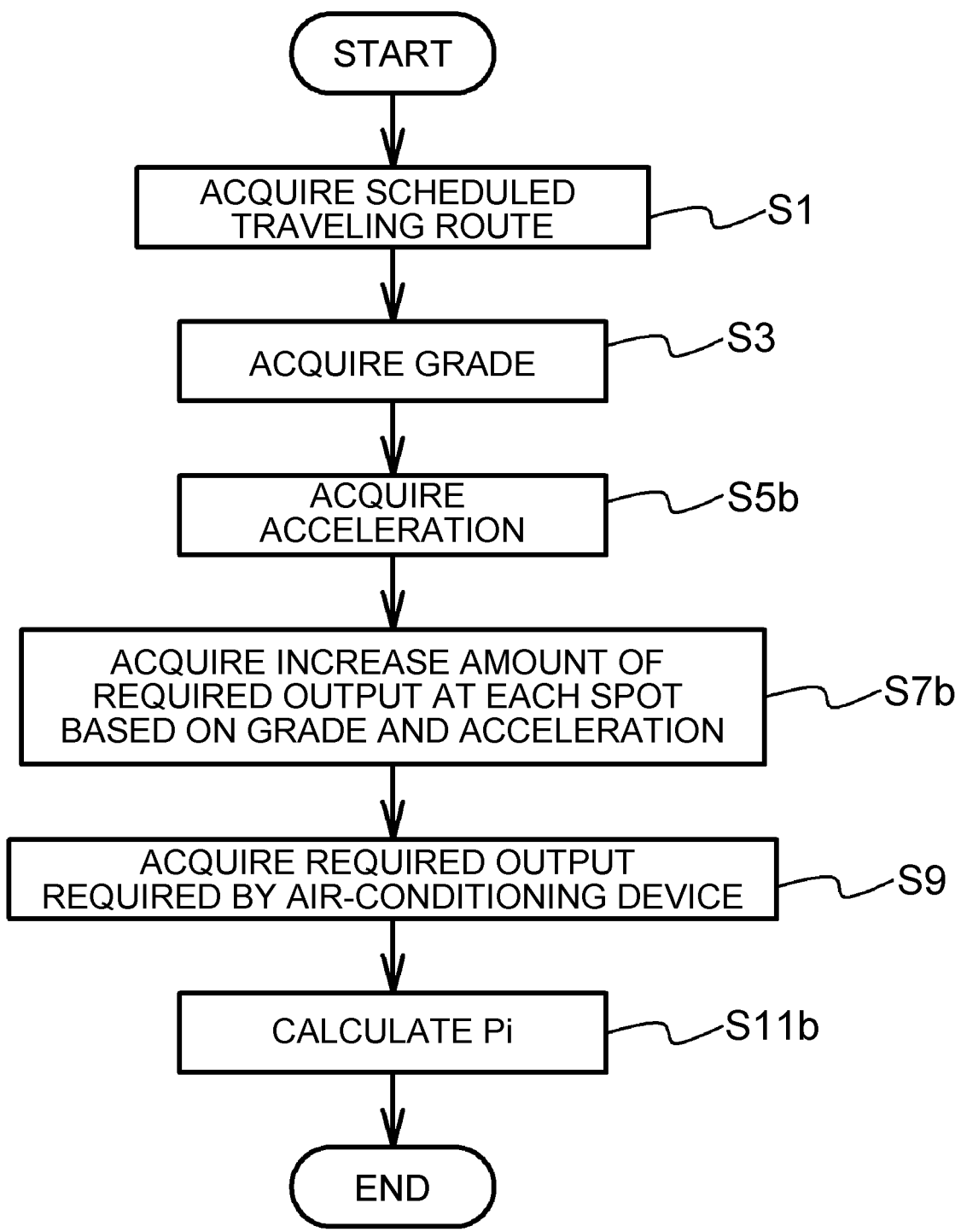
FIG. 11 is a flowchart showing an exemplary output prediction control in a second modification.

An output prediction control in a second modification will be described. In the second modification, an integrated value Pi of the predicted output value P is calculated based on grade and acceleration. FIG. 11 is a flowchart showing an exemplary output prediction control in the second modification.

In the above embodiment, the average vehicle speed is acquired, but in the second modification, the acceleration is calculated and acquired (step S5b). Specifically, the acceleration is calculated as follows. The velocity difference between a predetermined first spot on the scheduled traveling route and an adjacent second spot through which the vehicle 1 is scheduled to travel after the first spot is calculated by subtracting the average vehicle speed at the second spot from the average vehicle speed at the first spot acquired from the server 100. Next, a predicted time that is predicted to be needed when the vehicle 1 travels from the first spot to the second spot is calculated by dividing the distance between the first and second spots, which is acquired from the map data of the navigation device 90, by the average value of the average vehicle speed at the first spot and the average vehicle speed at the second spot. Next, the acceleration between the first and second spots is calculated by dividing the calculated velocity difference by the predicted time. By such a calculation method, each acceleration among the spots on the scheduled traveling route is calculated.

Figure 12:
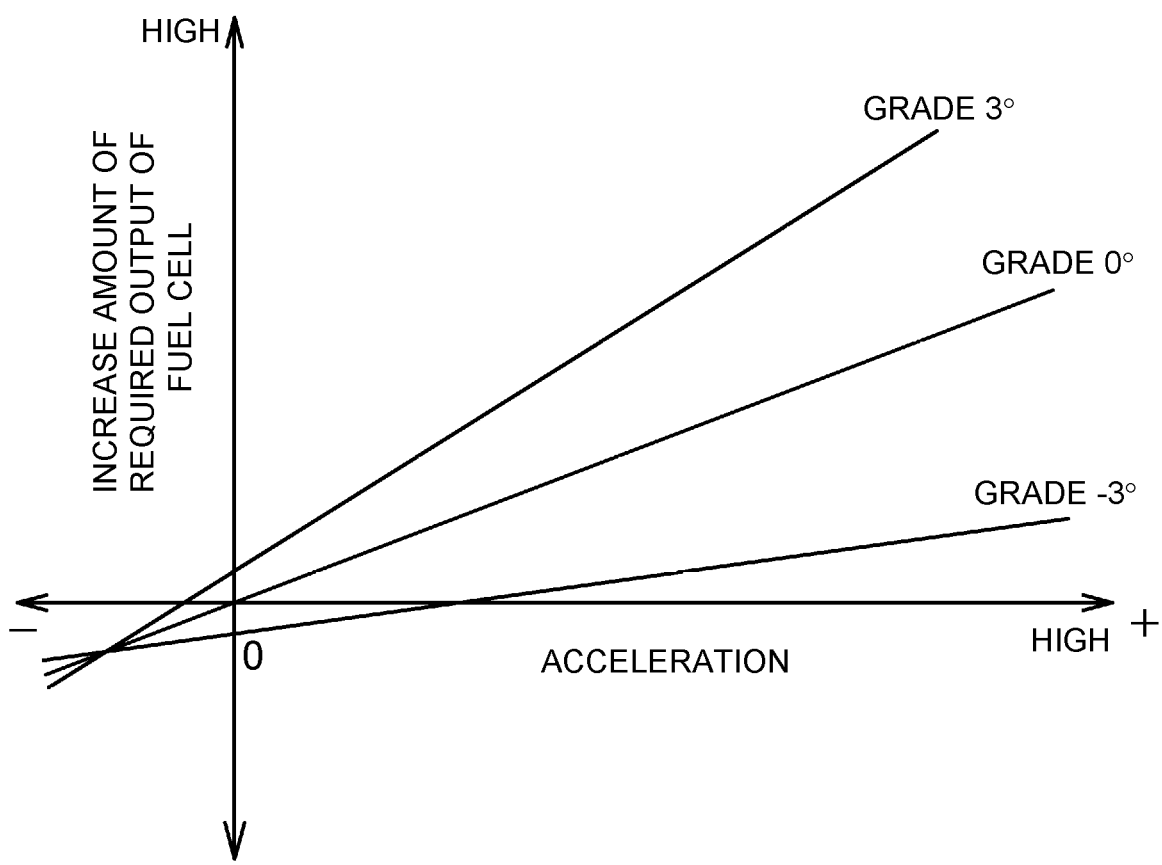
FIG. 12 is a map specifying an increase amount of the required output of the fuel cell for each acceleration and each grade.

Next, an increase amount of the required output of the fuel cell 20 at each spot is calculated and acquired, based on the acquired grade and acceleration (step S7b). Specifically, the increase amount of the required output of the fuel cell 20 is calculated and acquired as follows. FIG. 12 is a map specifying the increase amount of the required output of the fuel cell 20 for each acceleration and each grade. The map is previously calculated based on experiments, and is stored in the memory 64 of the control device 60. A positive value of the acceleration indicates an increase in speed, and a negative value of the acceleration indicates a decrease in speed. In the case of a grade of 0°, when the acceleration is a positive value, the increase amount of the required output of the fuel cell 20 increases as the acceleration increases, and when the acceleration is a negative value, the decrease amount of the required output of the fuel cell 20 increases as the absolute value of the acceleration increases. For example, in the case where the grade is an up-grade of 3°, the increase amount of the required output of the fuel cell 20 is a positive value even when the acceleration is zero. For example, in the case where the grade is a down-grade of −3°, the increase amount of the required output of the fuel cell 20 is a negative value even when the acceleration is zero. The increase amount of the required output of the fuel cell 20 at each spot on the scheduled traveling route is calculated by referring the map.

Next, similarly to the above-described embodiment, step S9 is executed, and the integrated value Pi of the predicted output value P after the current time point and before the elapse of a predetermined time, specifically, after the current time point and before the elapse of 30 minutes is calculated (step S11b). The integrated value Pi is an example of the parameter correlated with the predicted output value. Specifically, the integrated value Pi is calculated as follows. First, the required output of the fuel cell 20 based on the vehicle speed and grade at the current time point is calculated. The required output of the fuel cell 20 based on the vehicle speed and grade at the current time point is calculated based on the map shown in FIG. 12, after the vehicle speed at the current time point is acquired based on the output of an unillustrated vehicle speed sensor mounted in the vehicle 1 and the grade at the current spot is acquired from an unillustrated inclination sensor mounted in the vehicle 1 or the map data of the navigation device 90. Next, the total value of the required output of the fuel cell 20 based on the vehicle speed and grade at the current time point and the required output of the fuel cell 20 required by the air-conditioning device 70 is calculated as the initial value.

Next, the value resulting from integrating the increase amount of the required output of the fuel cell 20 in a period after the current time point and before the elapse of 30 minutes shown in FIG. 12 is calculated as the required output based on the grade and the like for each time, the value resulting from integrating the required amount of the fuel cell 20 required by the air-conditioning device 70 in the period after the current time point and before the elapse of 30 minutes is calculated as the required output based on the air-conditioning device 70 at each time, and the value resulting from adding the required output based on the grade and the like and the required output based on the air-conditioning device 70 for each time to the initial value is calculated as the integrated value Pi.

Figure 13:
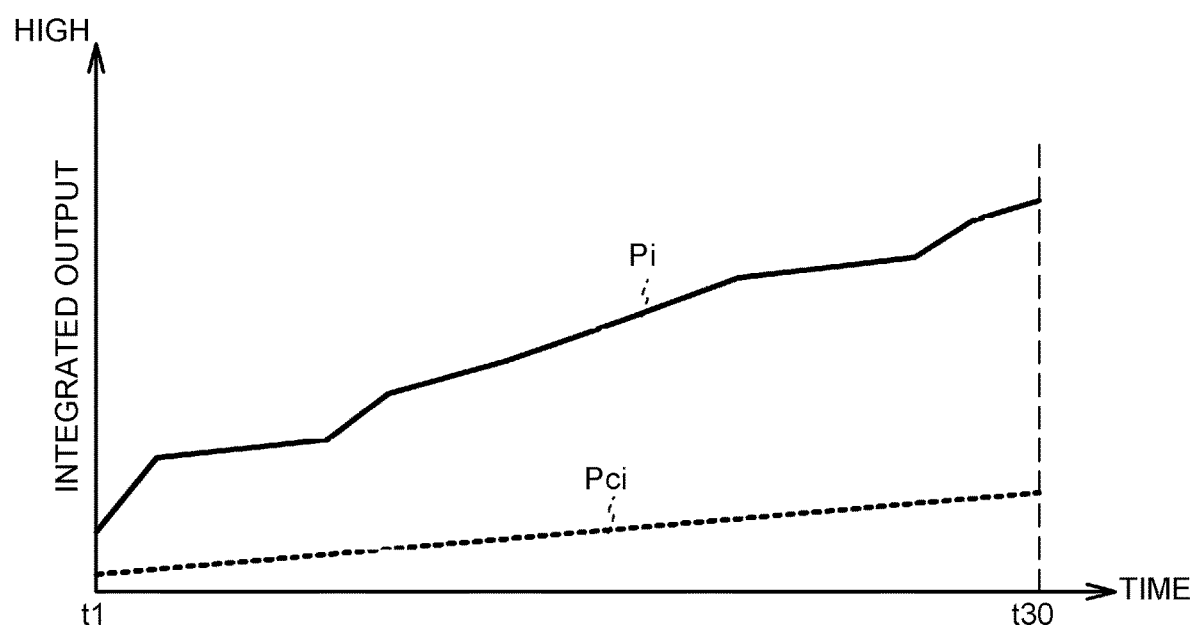
FIG. 13 is an exemplary graph showing a transition of an integrated value.

FIG. 13 is an exemplary graph showing a transition of the integrated value Pi. In FIG. 13, there is shown an integrated value Pci of the required output of the fuel cell 20 that is consumed by the air-conditioning device 70. In this way, when the integrated value Pi is calculated, the required output of the fuel cell 20 required by the air-conditioning device 70 is considered in addition to the grade and predicted vehicle speed on the scheduled traveling route, and therefore, the integrated value Pi is accurately calculated.

In the second modification also, the control device 60 and the server 100 may execute the steps in cooperation. For example, the server 100 may execute steps S1 to S7b, and the control device 60 of the vehicle 1 may execute step S9b and the subsequent processes. Further, the server 100 may execute steps S1 to S11b.

Next, an output prediction control in a third modification will be described. In the third modification, the integrated value Pi is calculated based on an average acceleration stored in the server 100 instead of the average vehicle speed. First, the average acceleration will be described. FIG. 14A shows exemplary average accelerations stored in the HDD 104 of the server 100. In the HDD 104, the average acceleration of the vehicle is stored for each spot.

Next, a control for calculating the average acceleration will be described. The control for calculating the average acceleration is executed by the server 100. FIG. 14B is a flowchart showing an exemplary control for calculating the average acceleration. The control is repeatedly executed with a constant period. First, from a plurality of vehicles, the current position of each vehicle and the acceleration of each vehicle at the position are acquired through the network N (step S101a). Next, the acquired position and acceleration are stored in the HDD 104, in association with each other (step S103a). Next, based on a plurality of accelerations acquired for an identical spot, the average acceleration, which is the average value of the accelerations, is calculated (step S105a). The calculated average acceleration is stored and updated in the HDD 104, in association with the spot (step S107a). Accordingly, the average acceleration at each spot is the average value of the accelerations of multiple vehicles including the vehicle 1 if the vehicle 1 has traveled through the spot, and is the average value of the accelerations of multiple vehicles not including the vehicle 1 if the vehicle 1 has not traveled through the spot.

Figure 15:
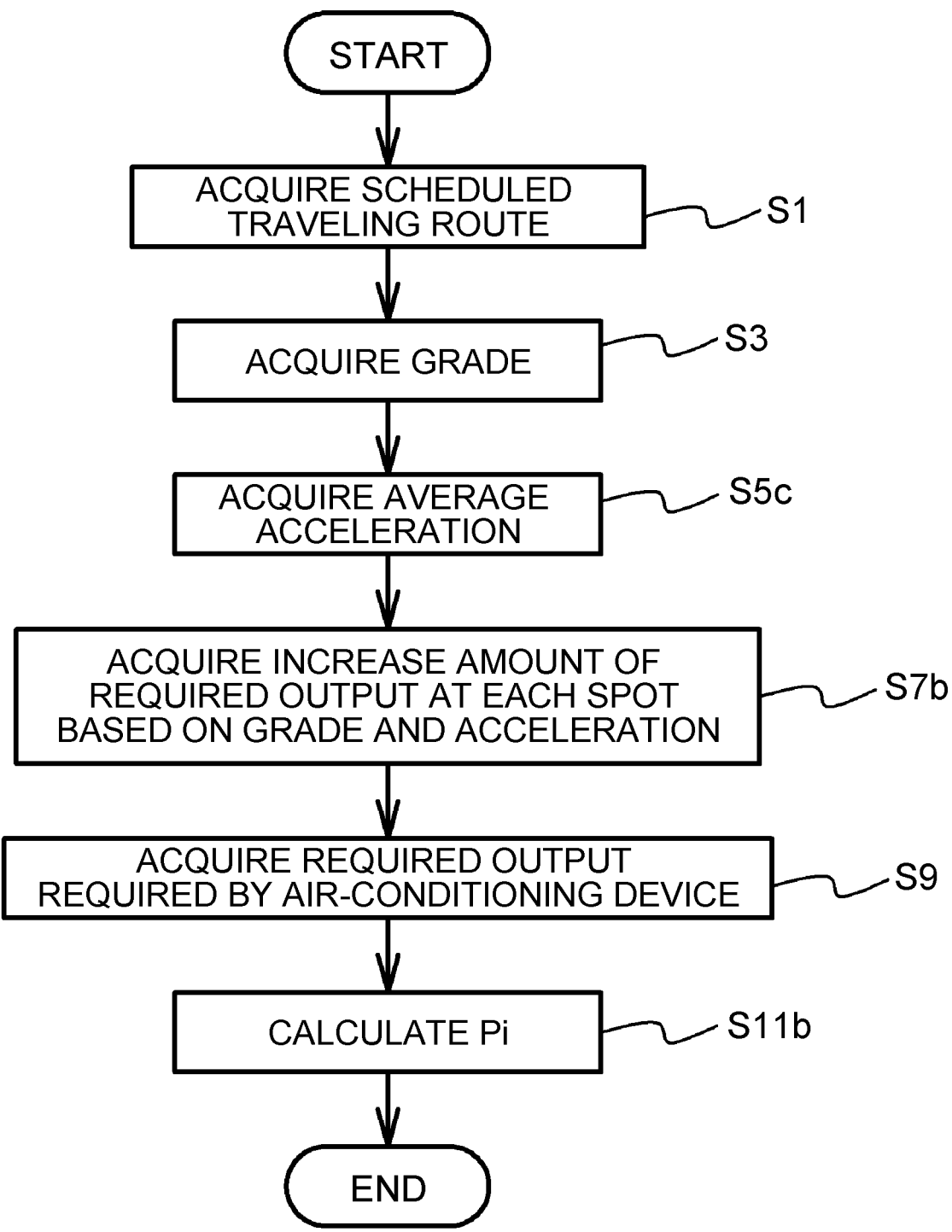
FIG. 15 is a flowchart showing an exemplary output prediction control in a third modification.

FIG. 15 is a flowchart showing an exemplary output prediction control in the third modification. After the grade at each spot on the scheduled traveling route is acquired in step S3, the average acceleration at each spot on the scheduled traveling route is acquired from the server 100 (step S5c). The average acceleration is acquired as an example of the predicted acceleration of the vehicle 1 that travels on the scheduled traveling route. Step S5c is an example of the process to be executed by the first acquisition unit that acquires the predicted acceleration from the server 100. Thereafter, similarly to the second modification, steps S7b, S9 and S11b are executed. Thus, the integrated value Pi is accurately calculated, based on the grade, the predicted acceleration, which is a substitute for the predicted vehicle speed, and the required output of the fuel cell 20 required by the air-conditioning device 70.

In the third modification also, the control device 60 and the server 100 may execute the steps in cooperation. For example, the server 100 may execute steps S1 to S7b, and the control device 60 of the vehicle 1 may execute step S9 and the subsequent processes. Further, the server 100 may execute steps S1 to S11b.

In the above embodiment and the above first and second modifications, the average vehicle speed acquired from the server 100 is used as an example of the predicted vehicle speed, but the predicted vehicle speed is not limited to this. For example, instead of the average vehicle speed of all vehicles that have traveled on the scheduled traveling route, the predicted vehicle speed may be the average vehicle speed of some vehicles that are of all vehicles and that are selected on the basis of a predetermined standard. For example, from the average vehicle speeds of multiple vehicles in which the acceleration becomes a predetermined value or higher at a high frequency in a certain traveling distance section and multiple vehicles in which the acceleration becomes the predetermined value or higher at a low frequency, the average vehicle speed of multiple vehicles including the vehicle 1 may be used as the predicted vehicle speed of the vehicle 1. In this case, the server 100 classifies the vehicles 1 to 1f and the like into the multiple vehicles in which the above frequency is high and the multiple vehicles in which the above frequency is low, based on the identification information and acceleration sent from each of the vehicles 1 to 1f and the like as needed, calculates each average vehicle speed, and stores each average vehicle speed in the HDD 104. The control device 60 of the vehicle 1 refers to the identification information of the vehicle 1 and the identification information stored in the HDD 104, and acquires the average vehicle speed of the multiple vehicles including the vehicle 1, from the HDD 104. Thereby, it is possible to acquire the predicted vehicle speed of the vehicle 1 in which the driving habit of a driver of the vehicle 1 is considered, and it is possible to calculate the predicted output value of the fuel cell 20 further accurately. Similarly, from the average vehicle speeds of multiple vehicles in which the vehicle speed exceeds a threshold correlated with the limiting velocity at each spot at a high frequency and multiple vehicles in which the vehicle speed exceeds the threshold at a low frequency, the average vehicle speed of multiple vehicles including the vehicle 1 may be used as the predicted vehicle speed of the vehicle 1. In this case, the server 100 classifies the vehicles 1 to 1f and the like into the multiple vehicles in which the above frequency is high and the multiple vehicles in which the above frequency is low, based on the identification information sent from each of the vehicles 1 to 1f and the like and the difference between the vehicle speed at each spot and the threshold correlated with the limiting velocity, calculates each average vehicle speed, and stores each average vehicle speed in the HDD 104. The control device 60 of the vehicle 1 refers to the identification information of the vehicle 1 and the identification information stored in the HDD 104, and acquires the average vehicle speed of the multiple vehicles including the vehicle 1, from the HDD 104. Examples of the identification information of the vehicle include a registration number written on a number plate, a frame number, and a serial number of a fuel cell if the vehicle is a fuel cell vehicle.

The latest average vehicle speed stored in the server 100 is used as an example of the predicted vehicle speed of the vehicle 1, but the predicted vehicle speed is not limited to this. For example, the past average vehicle speed may be used. For example, the past average vehicle speed may be the average vehicle speed at the same time on the previous day, or may be the average vehicle speed on the same day of the last week. In this case, the server 100 stores the position, vehicle speed and date-hour sent from each vehicle, in the HDD 104, in association with each other, calculates the average vehicle speed at each spot for each date and each hour, and then, stores the average vehicle speed in the HDD 104. That is, the information about the average vehicle speed shown in FIG. 3B is stored in the HDD 104 for each date and each hour.

The predicted vehicle speed of the vehicle 1 may be calculated based on the average vehicle speed stored in the server 100. For example, when the velocity difference resulting from subtracting the average vehicle speed stored in the server 100 from the actual vehicle speed of the vehicle 1 in a predetermined traveling section is a positive value of a predetermined value or more, the predicted vehicle speed is the value resulting from multiplying the average vehicle speed by a coefficient m (m>1), and when the velocity difference is a negative value and the absolute value of the velocity difference is a predetermined value or more, the predicted vehicle speed is the value resulting from multiplying the average vehicle speed by a coefficient l (0<l<1). In this case, the control device 60 of the vehicle 1 may store the actual vehicle speed of the vehicle 1 in the predetermined traveling section, and may calculate the predicted vehicle speed based on the actual vehicle speed and the average vehicle speed acquired from the server 100. Further, the control device 60 of the vehicle 1 may send the actual vehicle speed of the vehicle 1 to the server 100, and the server 100 may calculate the predicted vehicle speed based on the actual vehicle speed and the average vehicle speed, and may send the predicted vehicle speed to the control device 60.

When the average vehicle speed at a certain spot on the scheduled traveling route for the vehicle 1 is based on only the vehicle speed of one vehicle in the server 100, the vehicle speed of the one vehicle is used as the predicted vehicle speed of the vehicle 1. In this case, the vehicle speed stored in the server 100 may be the vehicle speed when the vehicle 1 traveled in the past, or may be the vehicle speed of another vehicle.

Further, the predicted vehicle speed of the vehicle 1 may be a vehicle speed that is stored in the server 100 and that is the vehicle speed when the vehicle 1 actually traveled on the scheduled traveling route in the past. In this case, the server 100 stores the identification information, position and vehicle speed of each vehicle, in the HDD 104, as needed. The control device 60 of the vehicle 1 refers to the identification information of the vehicle 1 and the identification information stored in the HDD 104, acquires the vehicle speed of the vehicle 1 on the scheduled traveling route, from the HDD 104, and uses the vehicle speed as the predicted vehicle speed of the vehicle 1. Further, the predicted vehicle speed of the vehicle 1 may be a vehicle speed in an identical time period, at a spot on the scheduled traveling route through which the vehicle 1 traveled in the past. In this case, the server 100, as needed, stores the identification information, position, vehicle speed and date-hour sent from each vehicle, in the HDD 104, in association with each other.

Similarly to the above embodiment and the above first and second modifications, the third modification may be configured as follows. The average acceleration to be acquired from the server 100 may be the average acceleration of some vehicles that are of all vehicles and that are selected on the basis of a predetermined standard. The past average acceleration stored in the server 100 may be used. Further, when the average vehicle speed at a certain spot on the scheduled traveling route for the vehicle 1 is based on only the acceleration of one vehicle in the server 100, the integrated value Pi may be calculated based on the acceleration of the one vehicle. In this case, the acceleration stored in the server 100 may be the acceleration when the vehicle 1 traveled in the past, or may be the acceleration of another vehicle.

In the above embodiment and the above modifications, the control device 60 acquires the scheduled traveling route from the navigation device 90 mounted in the vehicle 1, but the disclosure is not limited to this. For example, when the past traveling route for the vehicle 1 is stored in the HDD 104 of the server 100, the control device 60 may acquire the past traveling route as the scheduled traveling route. In this case, the server 100 associates the identification information and position of each vehicle, and stores a route from a departure place to an arrival place on which each vehicle traveled, as a traveling-experienced route, in the HDD 104. The control device 60 refers to the identification information of the vehicle 1 and the identification information stored in the HDD 104, and acquires the traveling-experienced route for the vehicle 1, from the HDD 104. When the current place of the vehicle 1 is contained in the traveling-experienced route, the control device 60 sets the arrival place of the traveling-experienced route, as the destination of this traveling, and acquires a route from the current place to the destination, as the scheduled traveling route.

In the above embodiment and the above modifications, the predicted output value of the fuel cell 20 is regarded as the total value of the required output of the fuel cell 20 required based on the grade and the predicted vehicle speed and the required output of the fuel cell 20 required by the air-conditioning device 70, but the disclosure is not limited to this. For example, in consideration of the output of the battery 52 for compensating the output of the fuel cell 20, the value resulting from subtracting a predetermined value corresponding to an output of the battery 52 for the compensation, from the above total value may be adopted as the predicted output value of the fuel cell 20. Further, in consideration of the output of the battery 52 for compensating the output of the fuel cell 20, the value resulting from multiplying the predicted output value by a predetermined coefficient k (0<k<1) may be adopted as the final predicted output value of the fuel cell 20.

In the above embodiment and the above modifications, the required output is calculated based on the grade and the predicted vehicle speed in step S7, and the required output is calculated based on the grade and the predicted acceleration in step S7b, but the disclosure is not limited to this. For example, in step S7, the required output may be calculated based on only the predicted vehicle speed, and in step S7b, the required output may be calculated based on only the predicted acceleration. This is because in many cases, the grade of the road is small and the average value of the grade is nearly zero in a range in which the driver usually travels, and the influence of the vehicle speed or the acceleration is dominant.

Thus, preferable embodiments in the disclosure have been described in detail. The disclosure is not limited to such specific embodiments, and various alterations and modifications can be made within the scope of the spirit described in the claims of the disclosure.

The invention claimed is:

1. An output prediction device for a fuel cell comprising:
a first acquisition circuitry configured to acquire a first required output of the fuel cell, the first required output being calculated based on predicted vehicle speeds or predicted accelerations of multiple vehicles including a vehicle traveling by using the fuel cell as a dynamic power source, the multiple vehicles traveling on a scheduled traveling route for the vehicle traveling by using the fuel cell;
a second acquisition circuitry configured to acquire a second required output of the fuel cell, the second required output being required by an air-conditioning device of the vehicle; and
a calculation circuitry configured to calculate a parameter correlated with a predicted output value of the fuel cell, based on the first required output and the second required output, the predicted output value being predicted as an output on the scheduled traveling route.

2. The output prediction device for the fuel cell according to claim 1, wherein
the first required output is calculated further based on a grade of the scheduled traveling route.

3. The output prediction device for the fuel cell according to claim 1, further comprising
a charging amount alteration circuitry configured to alter a target charging amount of a secondary battery, the secondary battery compensating a shortfall of the output of the fuel cell, wherein
when the parameter is higher than a threshold, the charging amount alteration circuitry previously increases the target charging amount compared to when the parameter is equal to or lower than the threshold.

4. The output prediction device for the fuel cell according to claim 1, wherein
the predicted vehicle speeds are calculated based on average vehicle speeds that are an average value of traveling velocities of the multiple vehicles when the multiple vehicles travel on the scheduled traveling route.

5. The output prediction device for the fuel cell according to claim 1, wherein
the predicted accelerations are calculated based on average accelerations that are an average value of accelerations of the multiple vehicles when the multiple vehicles travel on the scheduled traveling route.

6. The output prediction device for the fuel cell according to claim 1, wherein
the first required output is calculated based on the predicted vehicle speeds or the predicted accelerations that are acquired from a server by wireless communication, the server being disposed outside the vehicle.

7. An output prediction method for a fuel cell comprising:
acquiring a first required output of the fuel cell, the first required output being calculated based on predicted vehicle speeds or predicted accelerations of multiple vehicles including a vehicle traveling by using the fuel cell as a dynamic power source, the multiple vehicles traveling on a scheduled traveling route for the vehicle traveling by using the fuel cell;
acquiring a second required output of the fuel cell, the second required output being required by an air-conditioning device of the vehicle; and
calculating a parameter correlated with a predicted output value of the fuel cell, based on the first required output and the second required output, the predicted output value being predicted as an output on the scheduled traveling route.

8. A fuel cell system comprising:
a fuel cell; and
a control circuitry configured to control an output of the fuel cell, based on a parameter correlated with predicted output value of the fuel cell, the predicted output value being predicted as the output of the fuel cell on a scheduled traveling route for a vehicle and being calculated based on a first required output of the fuel cell and a second required output of the fuel cell, the first required output being calculated based on a predicted vehicle speeds or a predicted accelerations of multiple vehicles including the vehicle on the scheduled traveling route for the vehicle, the multiple vehicles traveling on a scheduled traveling route for the vehicle traveling by using the fuel cell, the second required output being required by an air-conditioning device of the vehicle, the vehicle traveling by using the fuel cell as a dynamic power source.

* * * * *